United States Patent [19]

Karr, Jr.

[11] Patent Number: 4,570,659
[45] Date of Patent: Feb. 18, 1986

[54] FIRE RESISTANT VALVE

[75] Inventor: Michael A. Karr, Jr., Houston, Tex.

[73] Assignee: Gray Tool Company, Houston, Tex.

[21] Appl. No.: 547,803

[22] Filed: Nov. 1, 1983

[51] Int. Cl.4 .......................... F16K 17/38; F16K 41/14
[52] U.S. Cl. ...................................... 137/72; 251/214; 251/330
[58] Field of Search ................... 137/72, 75; 251/330, 251/214

[56] References Cited

U.S. PATENT DOCUMENTS

| 364,842 | 6/1887 | Morrin | 251/330 X |
|---|---|---|---|
| 4,245,661 | 1/1981 | McGee | 137/72 |
| 4,271,857 | 6/1981 | Rowe | 137/75 X |
| 4,307,745 | 12/1981 | McGee | 137/72 |
| 4,510,960 | 4/1985 | Jennings et al. | 137/72 X |
| 4,540,012 | 9/1985 | Bridges | 137/72 |

FOREIGN PATENT DOCUMENTS 2426632 12/1975 Fed. Rep. of Germany ........ 137/72

Primary Examiner—Arnold Rosenthal

[57] ABSTRACT

A normally non-rising stem valve with a stem backseat (67,70) normally maintained in unseated position by a eutectic element (62). A spring (76) urges the backseat into seating position and is placed inwardly of a replaceable stem packing (34) so that upon melting of the eutectic (62) and positive seating of the backseat (67,70), the packing (34) can be replaced.

3 Claims, 3 Drawing Figures

FIRE RESISTANT VALVE

FIELD OF THE INVENTION

The present invention relates to an improvement in normally non-rising stem valves for use in the oil and gas producing industry, and particularly to an improved valve of this type having a metal-to-metal stem backseat that automatically becomes effective to prevent leakage along the stem of the valve when the valve is subjected to a predetermined high temperature, such as during a fire.

BACKGROUND OF THE INVENTION

The use of non-rising stem gate valves to control the flow of high pressure liquid or gas is well known in the energy producing industry. It is also known to use a metal-to-metal backseat seal between the valve stem and the valve bonnet to seal the inner valve chamber from the exterior environment in order to allow repacking of the valve stem or replacement of the valve stem journal bearings. See for example U.S. Pat. No. 4,149,558 "Selective Backseat Valve", by McGee et al.

In the oil and gas producing industries, this valve has been further modified so as to automatically backseat under high temperature conditions, such as a fire, during which the resilient packing seal between the valve stem and the valve bonnet may be damaged and allow leakage. This modification, disclosed in U.S. Pat. No. 4,289,157 "Valve With Heat-Responsive Bearing Assembly Providing Backseat Arrangement", by McGee, includes a fusible washer-like annulus placed in the valve stem journal bearing assembly. Upon heating of the valve to an abnormally high temperature, the fusible annulus melts and runs out of a passageway to the exterior of the valve. The valve stem is now free to rise a limited extent due to the internal valve chamber pressure, thereby engaging the annular metal-to-metal sealing surfaces provided on the valve bonnet and the valve stem.

While this design is satisfactory, it does not meet the requirement that there be a positive metal-to-metal backseat that is not dependent upon pressure within the valve chamber nor the requirement that while the backseat is thus in positive engagement, the design be such as to have the capability of replacing the stem packing so that the valve can again be operated in normal fashion after having been subjected to a high temperature such as a fire. In certain environments, these operational requirements are particularly desirable and may be insisted upon by the user.

SUMMARY OF THE INVENTION

The valve of the present invention meets these operating requirements with the normally non-rising stem actuator being positively biased into the backseating position by means of a suitable spring so that upon the valve being subjected to a high temperature such that a eutectic melts the stem moves into the backseat position by action of the spring and is held in this position. The location of the spring to provide this bias and the design of the valve is such that with the valve in its spring pressed backseat position, the normal stem packing which prevents leakage from the interior of the valve along the stem can be replaced and the valve reassembled such that it can again function in its normal intended manner.

DESCRIPTION OF THE PREFERRED EMBODIMENT

Figure 1:
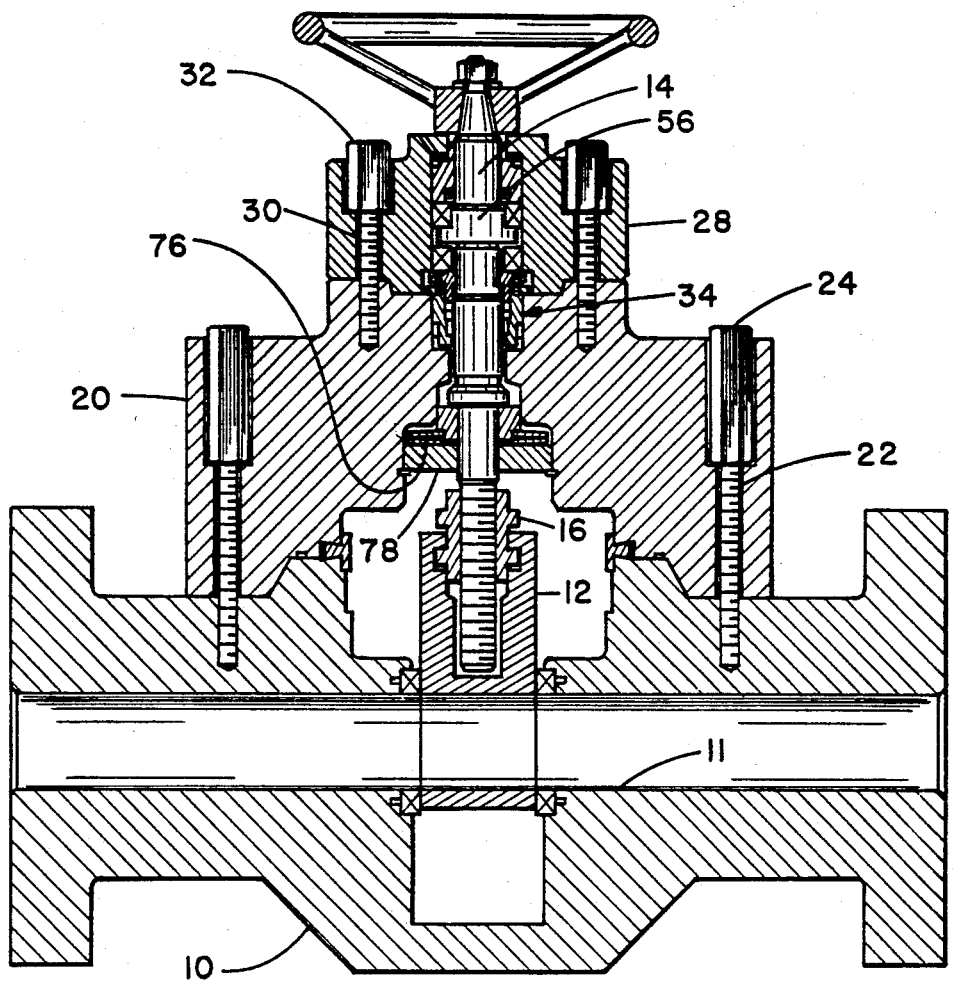
FIG. 1 is a sectional view of the valve of the invention.

Referring now to the drawing, wherein like reference numerals are used throughout to designate like elements, there is disclosed in FIG. 1 a valve having a body 10 and a gate 12. These elements are similar to those depicted in U.S. Pat. No. 4,307,745 issued Dec. 21, 1981 to McGee and for the purpose of showing the details of these elements, this patent is incorporated herein by reference.

While, in the illustrative embodiment, a gate valve is shown and described, it will be understood that the valving member can be other than of the gate type with any suitable known valving member being employable so long as it is moved to and from the open and closed position by means of rotation of a non-rising stem.

In the illustrative embodiment, the gate 12 is effective to control the flow through the conventionally aligned passageways 11 in body 10 and is operated between open and closed positions by means of the non-rising rotating stem 14 and the gate drive bushing 16 which is captured and retained in the gate in a manner such that it is inhibited from rotating and has internal threads that engage complimentary external threads on the lower end of stem 14 (all as more particularly shown and described in said U.S. Pat. No. 4,307,745 patent).

The valve chamber or cavity 18 is effectively closed or covered by bonnet 20 with stem 14 extending upwardly through a suitable bore in the bonnet. The bonnet 20 is secured to the valve body 10 in a fluid-tight manner by means of the studs 22 and nuts 24 as well as the seal members 26. The bonnet in turn has secured to its outer surface or upper end as depicted the bearing retainer 28 by means of studs 30 and nuts 32.

Stem 14 is mounted in the bearing retainer in a manner that permits rotation of the stem but normally prevents axially movement of the same and there is also mounted within the bearing retainer and a recess provided in the bonnet a seal that is normally effective to prevent fluid leakage from the chamber 18 along the stem 14.

For these purposes there is provided a cartridge seal designated generally 34 and which includes the seal body 36 having mounted on its lower exterior the packing seal 38 that is retained in position by means of the junk ring 40 and the snap-type retaining ring 42. Inwardly disposed of the body member 34 is the bearing ring 44, the seal members 46 and the packing gland 48. This gland is secured to the body member 36 by means of the screw fasteners 50 with the packing gland being effective to retain the seals 46 and bearing ring 44 in position as shown. This entire cartridge packing 36 is installed and removed as a unit thereby simplifying maintenance and replacement.

The bearing that mounts the stem 14 in position and retains it in position during operation of the valve includes the spaced bearing members 52 and 54 between which is retained the outwardly projecting flange of split ring 56. This split ring is retained in an annular recess provided in the stem 14 and is captured in this position by means of the bearing 54. The bearings 52 and 54 are retained in their operating position by means of the bearing gland 58 which has disposed in its lower inner region the bearing ring 60 and has a eutectic ring 62 mounted in a suitable recess formed in its upper end. A flange 64 formed on the upper end of the bearing retainer 28 engages the upper surface of this eutectic ring.

Figure 2:
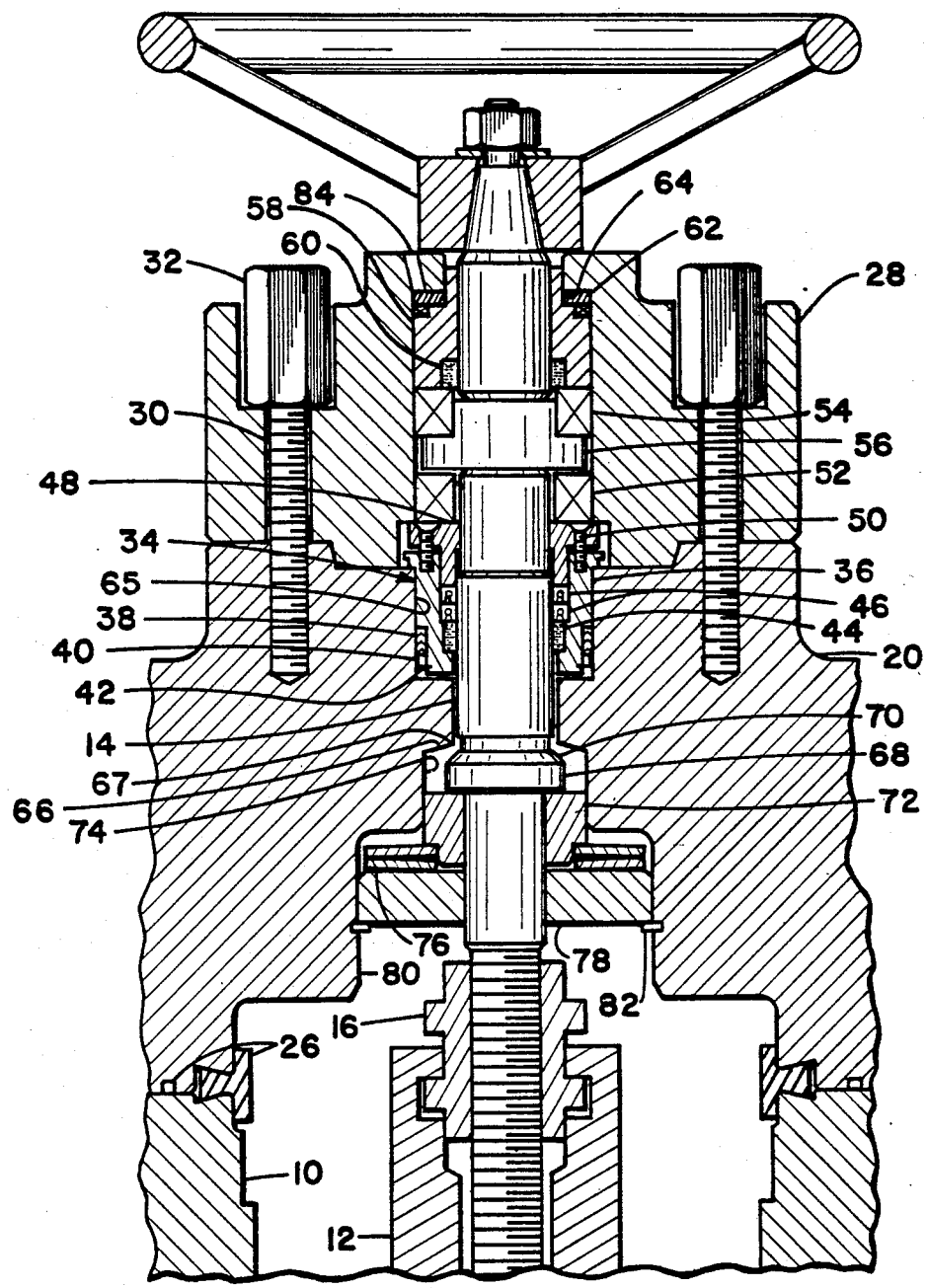
FIG. 2 is an enlarged sectional view principally of the operating mechanism of the valve in its normal operating condition.
Figure 3:
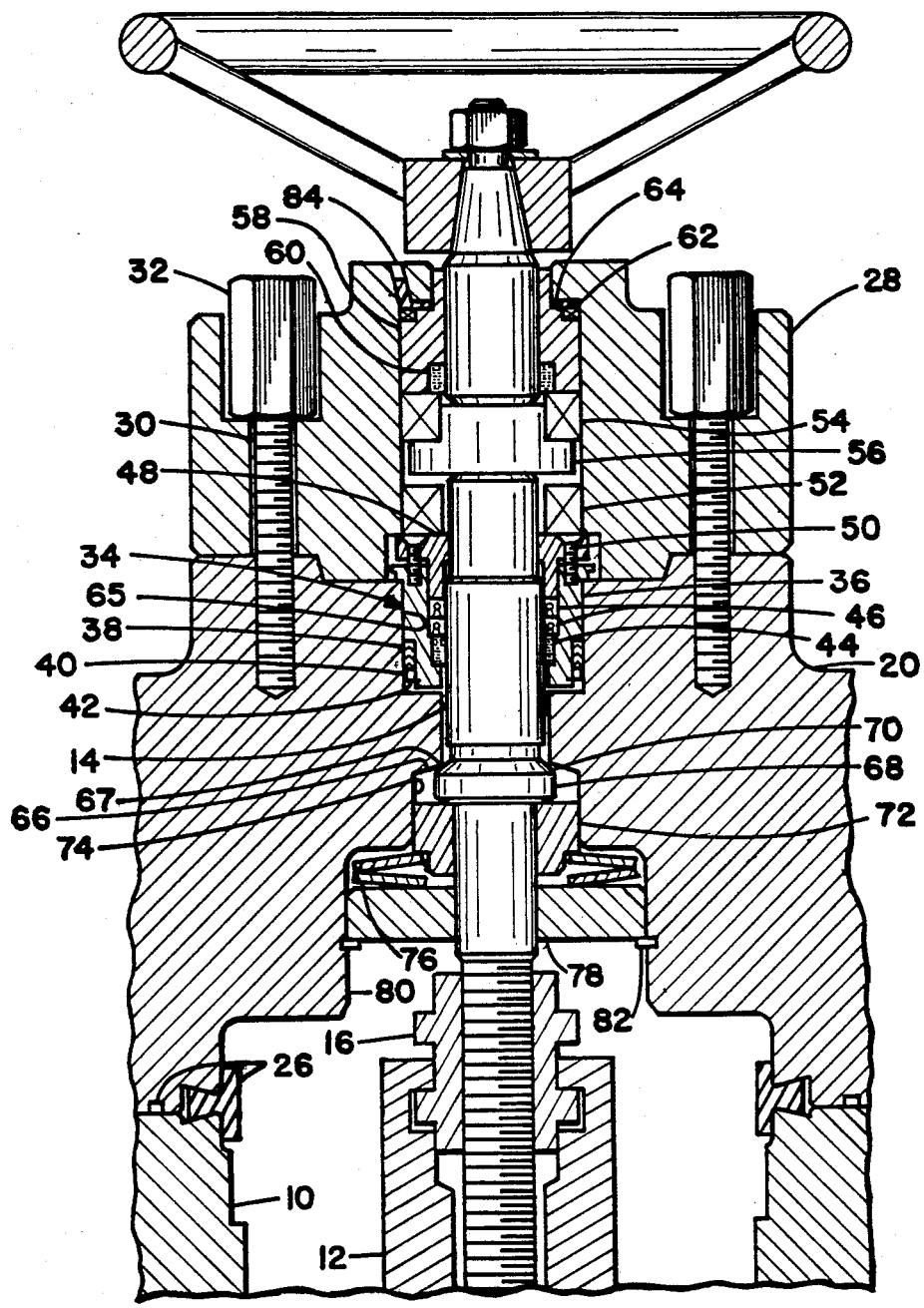
FIG. 3 is a view similar to FIG. 2 by showing the operating mechanism subsequent to exposure to high temperature with the back seat engaged.

This mechanism is thus retained in place and the stem mounted in its operating position as shown in FIG. 2 by fastening the bearing retainer 28 onto the bonnet 20 by means of the nuts 32. This action forces the packing cartridge 34 into position in the recess 65 in bonnet 20 with an outwardly extending radial portion of body 36 overlying and engaging the upper surface of the bonnet 20. The eutectic ring 62 is forced against the bearing gland 58 which in turn forces bearing 54 into engagement with split ring 56 which in turn engages bearing 52 and this bearing in turn engages the upper surface of cartridge packing assembly 34. These various elements are thus restrained from axial movement and the stem in turn is likewise restrained from axial movement while being able to rotate about its axis.

The valve is provided with a metal-to-metal stem backseat arrangement and for this purpose the bonnet is formed within an inwardly directed radial lip or portion 66 to form the stationary seat 67 of the metal-to-metal stem backseat and the stem is provided with an enlarged radial portion or shoulder 68 having a tapered seat 70 formed thereon to cooperate with the stationary seat 67. The seats 70 and 67 are normally in spaced relation as shown in FIG. 1 but a spring bias is provided for urging these metal surfaces into contact with each other. For this purpose, there is provided a load ring 72 mounted on the stem and received within the recess 74 provided in the valve bonnet. An annular or Belleville type spring 76 is effective to urge the load ring into engagement with the stem radial portion 68 and the Belleville spring is mounted in position as shown by means of the load plate 78 having an opening through which the stem 14 passes and which is received in the recess 80 with the snap-type retaining ring 82 retaining this plate in place.

In normal operation, rotation of the normally non-rising stem 14 moves the gate 12 to and from its open and closed positions with this stem being mounted as shown in FIG. 2 where the seats 67 and 70 are in spaced relation and the eutectic ring 62 is in tact. When the valve is subjected to a predetermined high temperature such as a fire, however, the ring 62 melts with the ring material passing out the passage 84 and the valve stem is moved outwardly or upwardly as depicted by means of the Belleville spring 76 so that there is a metal-to-metal backseat, i.e. the seats 70 and 67 are moved into sealing engagement with each other. This position of the valve is depicted in FIG. 2. Because of the spring bias urging the metal-to-metal backseat into engagement, the backseat will be moved into sealing position even though there is a very low or zero pressure within the valve body.

It will be apparent that with the backseat spring biased into sealing position, the stem seal cartridge 34 may then be replaced with this being desirable because of damage to or destruction of the packings 38 and 46 due to high temperature. The replacement of cartridge 34 is accomplished by removal of bearing retainer 28 and the sundry elements located outwardly of this cartridge. With the replacement of this cartridge and the reassembly of the valve including a new eutectic ring 62, the valve will be put back in its original condition and can be utilized and operated as it was prior to being subjected to the high temperature.

I claim:

1. A fire resistant valve having a valve body, a valve member in said body, a bonnet and a normally non-rising actuating stem for said valve member extending through a bore in said bonnet, a backseat arrangement between the stem and the bonnet, fusible means normally maintaining said backseat arrangement in a non-seating position by permitting the same to move into a seating position upon melting, a stem seal packing replaceable while the bonnet and stem remain in position, said packing being disposed between said stem and bonnet at a location outwardly of said backseat arrangement and spring means interposed between said stem and bonnet at a location inwardly of said stem seal packing effective to bias said backseat arrangement into seating position to thereby provide positive seating of the back seat during replacement of said packing.

2. The valve of claim 1 wherein said spring is a Belleville type spring.

3. A fire resistant gate valve comprising:
a body having a chamber opening to the exterior of the body and a passage extending through the body communicating with the chamber,
a gate moveable in said chamber to open and close said passage,
a bonnet secured to the body over said chamber opening and having a bore with an inwardly projecting seat facing said chamber,
a normally non-rising stem operatively connecting said gate and extending through said bore, said stem having a shoulder facing said bonnet seat,
means normally retaining said stem in a position where said shoulder is spaced from said seat and including a eutectic member which when subjected to a predetermined temperature permits said shoulder to move into seating arrangement with said seat,
replaceable stem seal packing means mounted in said bonnet outwardly of the bonnet seat, said packing being replaceable while the stem and bonnet remain in position, and
spring means intermediate said stem and body inwardly of the stem seal means effective to urge said shoulder toward and into engagement with the bonnet seat, whereby upon melting of said eutectic said spring means will move said shoulder into seating engagement with said seat and while thus positioned said packing means may be replaced, said spring means including a load ring abutting a flange on the stem inwardly of said shoulder, a load plate inwardly of said ring and through which the stem passes, said plate being removable secured to the bonnet and a Belleville-type spring interposed between said ring and plate.

* * * * *